US008133591B2

(12) United States Patent
Zhong et al.

(10) Patent No.: US 8,133,591 B2
(45) Date of Patent: Mar. 13, 2012

(54) ADHESION OF POLYMERIC COATINGS TO BIPOLAR PLATE SURFACES USING SILANE COUPLING AGENTS (75) Inventors: Feng Zhong, Windsor (CA); Tao Xie, Troy, MI (US); Richard H. Blunk, Macomb Township, MI (US); Mahmoud H. Abd Elhamid, Grosse Pointe Woods, MI (US); Brian K. Brady, North Chili, NY (US); Timothy J. Fuller, Pittsford, NY (US)

(73) Assignee: GM Global Technology Operations LLC

( * ) Notice: Subject to any disclaimer, the term of this patent is extended or adjusted under 35 U.S.C. 154(b) by 1161 days.

(21) Appl. No.: 11/475,499

(22) Filed: Jun. 27, 2006

(65) Prior Publication Data

US 2007/0298267 A1    Dec. 27, 2007

(51) Int. Cl.
B32B 15/08 (2006.01)
C08L 83/04 (2006.01)
(52) U.S. Cl. ........................................ 428/448; 428/447
(58) Field of Classification Search .................... 428/448
See application file for complete search history.

(56) References Cited

U.S. PATENT DOCUMENTS

| | | | | |
|---|---|---|---|---|
| 4,356,233 A * | 10/1982 | Lange et al. | ................... | 428/336 |
| 4,579,752 A * | 4/1986 | Dubois et al. | ............ | 427/255.18 |
| 5,006,248 A * | 4/1991 | Anderson et al. | ........ | 210/500.25 |
| 5,139,601 A * | 8/1992 | Holmes-Farley et al. | .... | 156/329 |
| 5,578,388 A | 11/1996 | Faita et al. | ....................... | 429/30 |
| 5,642,769 A | 7/1997 | Thöne et al. | ................... | 164/416 |
| 5,750,197 A * | 5/1998 | van Ooij et al. | ............... | 427/308 |
| 5,759,876 A * | 6/1998 | Singlevich et al. | ........... | 438/131 |
| 5,939,197 A * | 8/1999 | Blohowiak et al. | ........... | 428/413 |
| 6,133,373 A * | 10/2000 | Kirochko et al. | ............. | 524/805 |
| 6,203,854 B1 * | 3/2001 | Affinito | ........................ | 427/327 |
| 6,232,386 B1 * | 5/2001 | Vargo et al. | ................... | 524/434 |
| RE37,284 E | 7/2001 | Li et al. | ........................... | 429/32 |
| 6,261,638 B1 * | 7/2001 | van Ooij et al. | .............. | 427/379 |
| 6,346,174 B1 * | 2/2002 | Finley et al. | ............. | 204/192.15 |
| 6,355,305 B1 * | 3/2002 | Kirochko et al. | ............. | 427/387 |
| 6,372,376 B1 | 4/2002 | Fronk et al. | ..................... | 429/41 |
| 6,409,874 B1 * | 6/2002 | Van Der Aar et al. | ........ | 156/314 |
| 6,500,554 B2 | 12/2002 | Gahlmann et al. | ............ | 428/450 |
| 6,500,893 B2 * | 12/2002 | Yamada et al. | ............... | 524/495 |
| 6,608,129 B1 * | 8/2003 | Koloski et al. | ................ | 524/403 |
| 6,773,758 B2 * | 8/2004 | Yamanaka | ................. | 427/407.1 |
| 6,793,544 B2 | 9/2004 | Brady et al. | ................... | 439/866 |
| 6,811,918 B2 | 11/2004 | Blunk et al. | ..................... | 429/40 |
| 6,887,613 B2 | 5/2005 | Lee et al. | ......................... | 429/40 |
| 2003/0157391 A1 * | 8/2003 | Coleman et al. | ................ | 429/34 |

(Continued)

FOREIGN PATENT DOCUMENTS

EP           1035068           9/2000

(Continued)

Primary Examiner — Robert Loewe
(74) Attorney, Agent, or Firm — Harness, Dickey & Pierce, P.L.C.

(57) ABSTRACT

The present invention provides an electrically conductive element for an electrochemical cell element having enhanced protection for an underlying metal substrate with a surface susceptible to forming metal oxides. One or more regions of the surface are coated with a metal coating overlaid with an adhesion promoting coating comprising a silicon containing material derived from organosilanes. The adhesion promoting coating is overlaid with a conductive, protective polymeric coating. The present invention further provides methods of making such an electrochemical cell element to have improved adhesion of conductive, protective polymer coatings.

8 Claims, 6 Drawing Sheets

U.S. PATENT DOCUMENTS

| | | | |
|---|---|---|---|
| 2004/0081881 A1* | 4/2004 | Vyas et al. | 429/44 |
| 2004/0099845 A1* | 5/2004 | Simendinger et al. | 252/389.32 |
| 2004/0224096 A1* | 11/2004 | Yamanaka | 427/407.1 |
| 2004/0258977 A1* | 12/2004 | Frank et al. | 429/35 |
| 2005/0095492 A1* | 5/2005 | Frank et al. | 429/35 |
| 2005/0186700 A1* | 8/2005 | Klauk et al. | 438/99 |
| 2005/0214648 A1* | 9/2005 | Boulton et al. | 429/234 |
| 2006/0127737 A1* | 6/2006 | Frank et al. | 429/35 |
| 2006/0280992 A1* | 12/2006 | Miyagawa | 429/34 |
| 2008/0057371 A1* | 3/2008 | Washima et al. | 429/33 |

FOREIGN PATENT DOCUMENTS

WO    WO 2004099465 A1 * 11/2004

* cited by examiner

United States Patent US 8,133,591 B2

ADHESION OF POLYMERIC COATINGS TO BIPOLAR PLATE SURFACES USING SILANE COUPLING AGENTS

FIELD OF THE INVENTION

The present invention relates to PEM fuel cells and more particularly to corrosion-resistant electrically conductive elements therefor.

BACKGROUND OF THE INVENTION

Fuel cells have been proposed as a power source for electric vehicles and other applications. One known fuel cell is the PEM (i.e., Proton Exchange Membrane) fuel cell that includes a so-called MEA ("membrane-electrode-assembly") comprising a thin, solid polymer membrane-electrolyte having an anode on one face and a cathode on the opposite face. The anode and cathode typically comprise finely divided carbon particles, very finely divided catalytic particles supported on the internal and external surfaces of the carbon particles, and proton conductive material intermingled with the catalytic and carbon particles. The MEA is sandwiched between a pair of electrically conductive contact elements which serve as current collectors for the anode and cathode, which may contain appropriate channels and openings therein for distributing the fuel cell's gaseous reactants (i.e., $H_2$ and $O_2$/air) over the surfaces of the respective anode and cathode.

Bipolar PEM fuel cells comprise a plurality of the MEAs stacked together in electrical series while being separated one from the next by an impermeable, electrically conductive contact element known as a bipolar plate or septum. The bipolar plate has two working surfaces, one confronting the anode of one cell and the other confronting the cathode on the next adjacent cell in the stack. The bipolar plate conducts electrical current between the adjacent cells. Contact elements at the ends of the stack contact only the end cells and are referred to as end plates.

Contact elements are often constructed from electrically conductive metal materials. In an $H_2$ and $O_2$/air PEM fuel cell environment, the bipolar plates and other contact elements (e.g., end plates) are in constant contact with highly acidic solutions (pH 3-5) and operate in a highly oxidizing environment, being polarized to a maximum of about +1 V (vs. the normal hydrogen electrode). On the cathode side the contact elements are exposed to pressurized air, and on the anode side exposed to hydrogen. Unfortunately, many metals are susceptible to corrosion in the hostile PEM fuel cell environment, and some also form highly electrically resistive, passivating oxide films on their surface (e.g., in the case of stainless steel, nickel, magnesium, aluminum, titanium, or alloys) that increases the internal resistance of the fuel cell and reduces its performance.

In light of the corrosion sensitivity of these metals, efforts have been made to develop conductive polymeric protective coatings. One effort includes protective polymeric coatings that have a minimum impact on electrical resistance and maintain an acceptable level of conductivity, however these coatings have the potential to peel or chip due to the potential reduction of coating adhesion while the element is exposed to the humidified gases and high temperature and pressure of the working fuel cell environment. Coating detachment could potentially expose the underlying metal substrate to corrosion and/or decreased conductivity.

Accordingly, there is a need for an increased adhesion of protective polymeric, and electrically conductive coatings to the substrate while maintaining electrical conductivity, to resist the fuel cell's hostile environment and to improve the overall efficiency, durability, and longevity of the electrochemical cell.

SUMMARY OF THE INVENTION

The present invention provides an electrically conductive element for an electrochemical cell comprising an electrically conductive substrate comprising a metal surface susceptible to forming oxides in the presence of oxygen. The surface has one or more regions overlaid with a metal coating layer. The metal coated regions are overlaid with an adhesion promoting coating, where the adhesion promoting coating comprises a polymer comprising silicon. One or more of the silicon containing polymer coated regions are coated with a corrosion resistant protective polymeric coating.

In another aspect, the present invention relates to a method of making an element for a fuel cell, comprising providing a metal substrate surface susceptible to forming oxides in the presence of oxygen, applying a metal coating to one or more regions of the substrate, applying an adhesion promoting coating comprising a silicon containing polymer over the metal coated regions of a surface of the substrate, and overlaying the adhesion promoting coating with a corrosion resistant coating overlying at the one or more regions.

The present invention also relates to a method of making an element for a fuel cell. A hydrolyzation agent is admixed with an adhesion promoting solution to form a mixture. The adhesion promoting solution comprises a functionalized silane and a solvent comprising water. The hydrolyzation agent hydrolyzes at least a portion of the functionalized silane containing mixture to form a polymer comprising silicon. The hydrolyzed mixture is then applied to one or more regions of a metal coating layer such that a portion of the solvent and a portion of the hydrolyzation agent are removed from the mixture and the polymer comprising silicon remains in a substantially solid phase overlying the metal coating layer to form an adhesion promoting coating. The adhesion promoting coating is overlaid with a corrosion resistant protective polymeric coating at the one or more regions.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention relates to an electrically conductive element in an electrochemical cell. The conductive element comprises a metal substrate with a surface susceptible to forming metal oxides in the presence of oxygen, which has one or more regions coated with a metal coating and a silane adhesion promoting coating overlying at least a region of the metal coating. An electrically conductive corrosion-resistant polymeric protective coating overlaps the adhesion promoting sub-layer. The combination of the adhesion promoting coating and the metal coating enhances adhesion between the underlying metal substrate and the electrically conductive corrosion resistant polymeric protective coating. In this manner, the underlying substrate is protected from the corrosive environment of the fuel cell. The metal coating can be selected from titanium, zirconium, and tantalum, for example. Although various parts of the disclosure may specifically highlight the use of titanium as the metal coating, it is understood that any of the above metals or others can be used.

Figure 1:
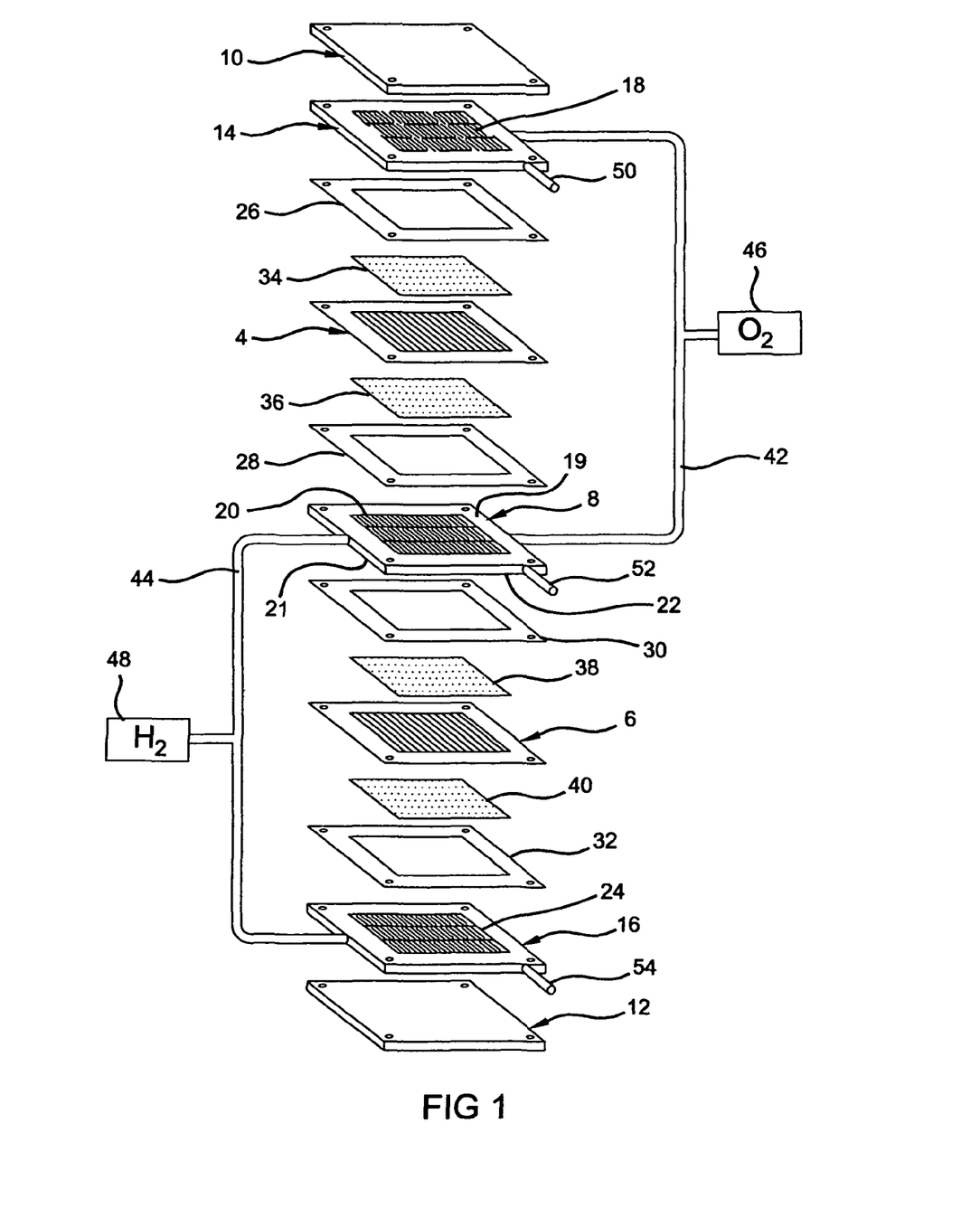
FIG. 1 is a schematic illustration of two cells in a liquid-cooled PEM fuel cell stack.

First, to better understand the present invention, a description of an exemplary fuel cell and stack are provided herein. FIG. 1 depicts two individual proton exchange membrane (PEM) fuel cells connected to form a stack having a pair of membrane-electrode-assemblies (MEAs) 4 and 6 separated from each other by an electrically conductive, liquid-cooled, bipolar separator plate 8. An individual fuel cell, which is not connected in series within a stack, has a separator plate 8 with a single electrically active side. In a stack, a preferred bipolar separator plate 8 typically has two electrically active sides 19, 21 within the stack, each active side 19, 21, respectively, facing a separate MEA 4, 6 with opposite charges that are separated, hence the so-called "bipolar" plate. As described herein, the fuel cell stack is described as having conductive bipolar plates; however, the present invention is equally applicable to conductive plates within a single fuel cell.

The MEAs 4 and 6, and bipolar plate 8, are stacked together between stainless steel clamping plates 10 and 12, and end contact elements 14 and 16. The end contact elements 14 and 16, as well as both working faces of the bipolar plate 8, contain a plurality of channels 18, 20, 22, and 24 for distributing fuel and oxidant gases (i.e., $H_2$ & $O_2$) to the MEAs 4 and 6. Nonconductive gaskets or seals 26, 28, 30, and 32 provide seals and electrical insulation between the several components of the fuel cell stack. Gas-permeable conductive diffusion media 34, 36, 38 and 40 press up against the electrode faces of the MEAs 4 and 6. The end contact elements 14 and 16 press up against the diffusion media 34 and 40 respectively, while the bipolar plate 8 presses up against the diffusion media 36 on the anode face of the MEA 4, and against diffusion media 38 on the cathode face of MEA 6.

Oxygen is supplied to the cathode side of the fuel cell stack from storage tank 46 via appropriate supply plumbing 42, while hydrogen is supplied to the anode side of the fuel cell from storage tank 48, via appropriate supply plumbing 44. Alternatively, air may be supplied to the cathode side from the ambient, and hydrogen to the anode from a methanol or gasoline reformer, or the like. Exhaust plumbing (not shown) for both the $H_2$ and $O_2$/air sides of the MEAs will also be provided. Additional plumbing 50, 52, 54 is provided for circulating coolant through the bipolar plate 8 and end plates 14 and 16.

Figure 2:
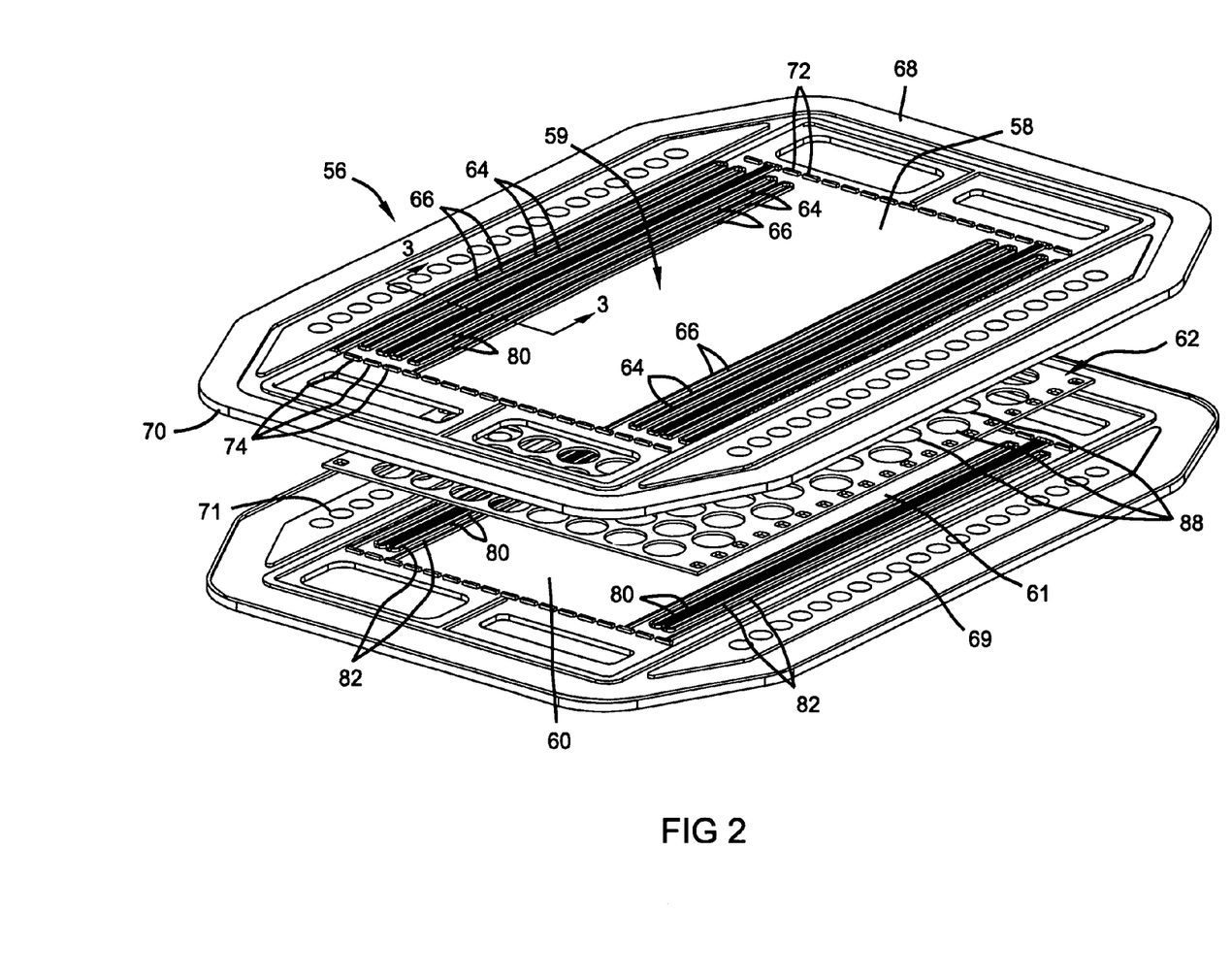
FIG. 2 is an exploded, isometric view of a bipolar plate useful with PEM fuel cell stacks like that illustrated in FIG. 1.

FIG. 2 is an isometric, exploded view of an exemplary bipolar plate 56 comprising a first exterior metal sheet 58, a second exterior metal sheet 60, and an interior spacer metal sheet 62 interjacent the first metal sheet 58 and the second metal sheet 60. The exterior metal sheets 58 and 60 are fabricated as thinly as possible (e.g., about 50 micrometers to about 500 micrometers thick) and may be formed by stamping, by photo etching (i.e., through a photolithographic mask) or any other conventional process for shaping sheet metal.

The external sheet 58 has a first working face 59 on the outside thereof which confronts a membrane-electrode-assembly (not shown) and is formed so as to provide a plurality of lands 64 which define therebetween a plurality of grooves 66 known as a "flow field" through which the fuel cell's reactant gases (i.e., $H_2$ or $O_2$) flow in a tortuous path from an inlet side 68 of the bipolar plate to an outlet side 70 thereof. When the fuel cell is fully assembled, the lands 64 press against the diffusion media 36, 38 (FIG. 1) which, in turn, presses against the MEAs 4 and 6 respectively. For drafting simplicity, FIG. 2 depicts only two arrays of lands and grooves. In reality, the lands and grooves will cover the entire external faces of the metal sheets 58 and 60 that engage the diffusion media 36 and 38. The reactant gas is supplied to grooves 66 from a header or manifold groove 72 that lies along one side 68 of the fuel cell, and exits the grooves 66 via another header/manifold groove 74 that lies adjacent the opposite side 70 of the fuel cell.

Figure 3:
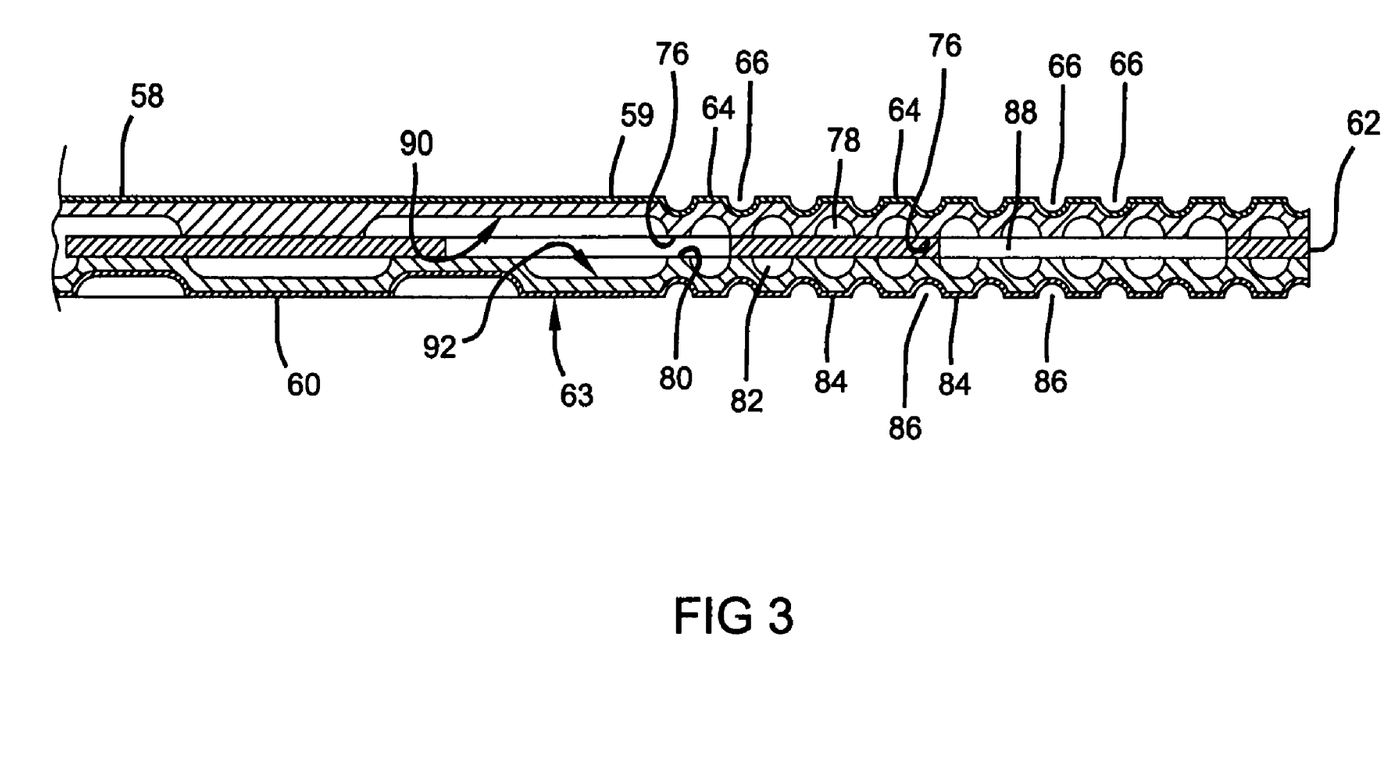
FIG. 3 is a sectioned view in the direction 3-3' of FIG. 2.

Metal sheet 60 is similar to sheet 58. The internal face 61 (i.e., coolant side) of sheet 60 is shown in FIG. 2. In this regard, there is depicted a plurality of ridges 80 defining therebetween a plurality of channels 82 through which coolant flows from one side 69 of the bipolar plate to the other 71. Like sheet 58 and as best shown in FIG. 3, which is a cross-sectional view along line 3-3' of FIG. 2, the external side of the sheet 60 has a working face 63 having a plurality of lands 64 thereon defining a plurality of grooves 66 through which the reactant gases pass. An interior metal spacer sheet 62 is positioned interjacent the exterior sheets 58 and 60 and includes a plurality of apertures 88 therein to permit coolant to flow between the channels 82 in sheet 60 and the channels 78 in the sheet 58 thereby breaking laminar boundary layers and affording turbulence which enhances heat exchange with the inside faces 90 and 92 of the exterior sheets 58 and 60 respectively. As appreciated by one of skill in the art, a similar configuration can be used in a single fuel cell conductive plate, which is bounded internally by the MEA and externally by the end plates, where a coolant field may be used along the active face.

Selection of the material of construction for all elements in a fuel cell, and most particularly to bipolar plates, such as those in 56 (e.g., 58 and 60), includes weighing parameters such as overall density (mass and volume), electrical contact resistance of the substrate measured at the surface, bulk conductivity, and corrosion and oxidation resistance. For example, stainless steels are particularly desirable metals for use within a fuel cell, due to their relatively high bulk electrical conductivity and corrosion resistance provided by a dense passivation (i.e., metal oxide) layer at the surface. Stainless steel materials have relatively high strength, physical durability, adherence to polymer coatings, and are less expensive than many other conductive metal alternatives and can be formed into thin sheets that improve gravimetric efficiency. However, an extensive and thick oxide layer at the surface of a stainless steel element impermissibly increases electrical contact resistance of the substrate, which has previously posed difficulty in using it independently as an electrical contact element or current collector. Additionally, many other relatively lightweight metals are susceptible to corrosive attack (e.g., aluminum), as well as passivation by the formation of metal oxides at the surface. As used herein, "corrosion" refers to the unintentional and destructive attack or inactivation of a material, which generally occurs by an electrochemical dissolution. Thus, a corrosion-susceptible material, such as a metal, is subject to degradation and/or passivation within an operating fuel cell environment.

In light of such corrosion sensitivity and similar propensity for oxidation, various protective coatings are preferred for protection of the underlying metal substrate 58,60. Some protective coatings have the potential to increase the electrical resistance of the surfaces (such as, 59,63) of the metal plate 58,60 to unacceptable levels or are very costly, such as with thick gold or platinum coatings. More economical alternatives, such as certain polymeric protective coatings, may peel or chip when subjected to electrochemical cell conditions for long durations, especially with stainless steel substrates, thereby exposing the underlying metal substrate to corrosive/oxidative attack. Thus, there is a trade-off between conductivity and corrosion protection. One aspect of the present invention is an enhanced adhesion of the protective polymeric coating to the metal substrate (e.g., 58, 60) while retaining a desirable electrical contact resistance for the electrically conductive element 56.

Figure 4:
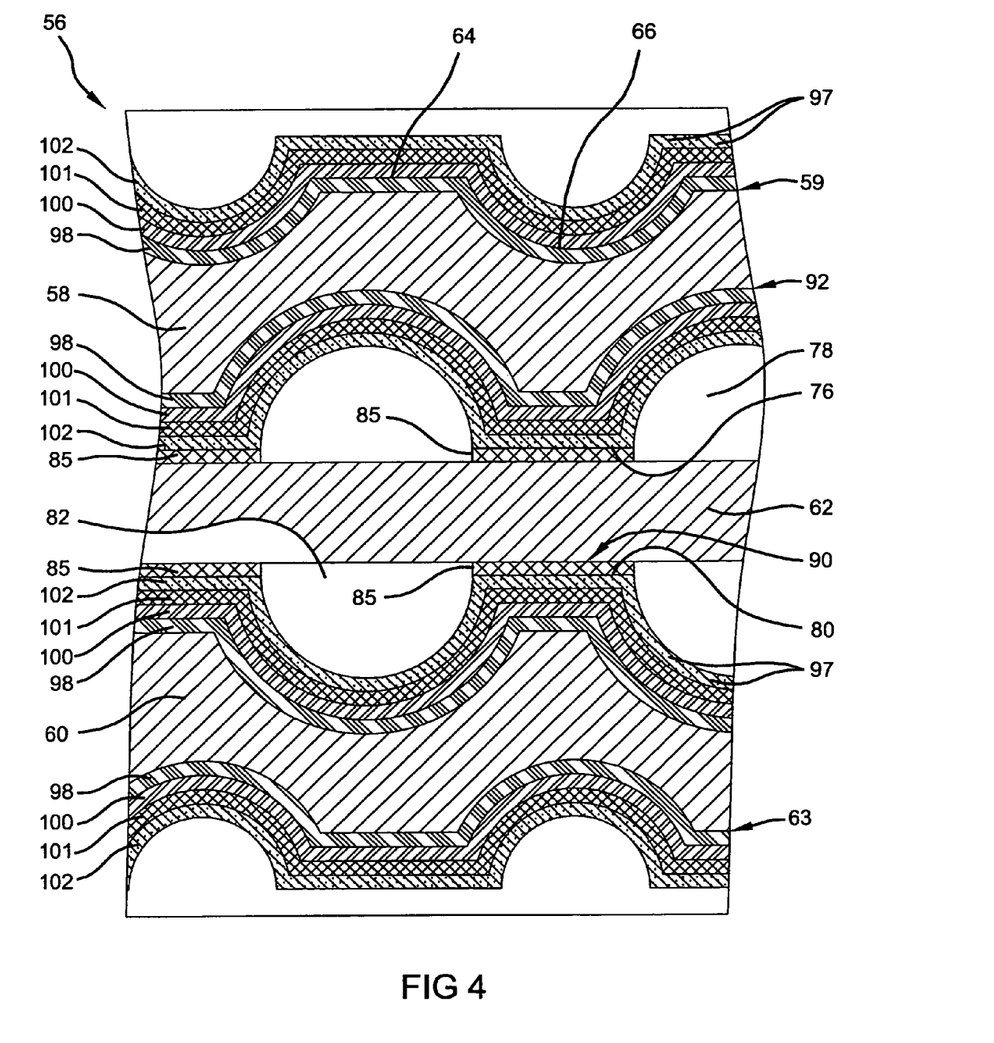
FIG. 4 is a magnified portion of the bipolar plate of FIG. 3 showing a preferred embodiment of the present invention showing a titanium coating, a metal coating oxides layer, a silane adhesion promoting coating, and a protective polymeric coating.

FIG. 4 is a magnified view of a cross-sectional view of FIG. 3 and shows the ridges 76 on the first sheet 58, and the ridges 80 on the second sheet 60 bonded (e.g., by brazement 85) to the spacer sheet 62. The present invention comprises a metal substrate forming the contact element sheets 58,60 which comprise a metal susceptible to forming oxides in the presence of oxygen. In some preferred embodiments, the metal is also corrosion-susceptible.

As shown in FIG. 4, various embodiments of the present invention protect the working faces 59, 63 of the substrate metal of the first and second sheets 58, 60 by providing a metal coating 98 and a sub-layer of an adhesion promoting coating 101 (also commonly referred to as tie-layers or coupling agents), which enhances the adhesion of a prophylactic protective polymeric coating 102. A titanium coating 98 is exemplified as the metal coating herein. It is understood that the metal coating 98 can be made of titanium, zirconium, or tantalum, for example.

In various embodiments, the substrate and the metal coating can be made of the same material. For example, in embodiments where the substrate is titanium, the titanium coating 98 can be the top surface of the substrate 58,60 or the titanium coating 98 can be an additional layer of titanium applied to the substrate 58,60. A protective polymeric coating 102 protects the underlying substrate 58,60 and can be either oxidation-resistant, corrosion-resistant, or both, generally protecting the underlying substrate 58,60 from both additional oxidation and/or acid-attack upon exposure to the fuel-cell environment by increasing the adhesion of the prophylactic coating 102 to the metal substrate surfaces 59,60. Such an increased adhesion of the protective polymeric coating 102 to the substrates 59,60 is enhanced over an adhesion between a comparative metal substrate (similar to 58,60) having a protective polymeric coating (similar to 102) with no titanium coating and/or adhesion promoting sub-layer therebetween (configuration not shown). While not limiting as to the present invention, the titanium coating 98 is believed to further enhance the longevity of the adhesion promoting coating 102 as the titanium oxides which may form on the surface of the titanium coating 98 are believed to have a particular affinity and strong chemical attraction towards the adhesion promoting sub-layer 102 or form chemical bonds with the adhesion promoting sub-layer 102.

The titanium coating 98 may be applied by any suitable means. The application can result in strong bonds forming between the titanium coating 98 and the metal substrate 58. Suitable techniques to create the bonds include, but are not limited to, immersion plating, chemical conversion, coil coating, mechanical plating, detonation gun, plasma arc, vacuum plasma, wire arc, chemical vapor deposition, electron beam evaporation, ion beam assisted deposition, ion implantation, ion plating, physical vapor deposition, sputtering, and vacuum metallizing. In certain preferred embodiments, the titanium coating 98 is applied to the metal substrate 58 using chemical vapor deposition, physical vapor deposition, or coil coating as such processes are economical and readily available for applying the titanium coating 98. In embodiments using coil coating, the coil coating process can be advantageously coupled to chemical vapor deposition or physical vapor deposition to effectively deposit the titanium coating 98. The coil coating process is a continuous feed process for coating a metal before fabrication. A coil of the sheet metal stock is provided and fed into a coil coating machine where the sheet metal stock is coated with a target material (here, such a target material can be selected as the titanium coating 98, the adhesion promoting coating 101, and/or the protective coating 102). The sheet metal stock is unwound and the titanium coating 98 is simultaneously applied to both sides of the sheet metal stock by roll coating. Additionally, the coil coating apparatus can include several application and/or treatment steps to pre-treat, clean, cure, laminate, or post-treat the sheet metal stock. Upon completion of the coil coating process, the titanium coated sheet metal stock can be returned to the coil shape, or it may be pressed and stamped into the desired shape of the electrically conductive cell, for example.

In alternate embodiments, the titanium layer 98 can be applied by stamping a titanium foil onto a metal sheet substrate 58. Suitable stamping techniques include those utilizing machinery such as the mechanical press, hydraulic press, or a progressive die press. Application of heat and pressure to the stamping technique is determined based on the properties of the metal substrate 58 and the titanium coating 98 employed (i.e.: thickness and desired end shape of the stamped piece).

The thickness of the titanium coating 98 is less than about 50 nanometers. In various embodiments, the thickness is less than about 30 nanometers or less than about 10 nanometers. The appropriate thickness of the titanium coating 98 is determined based on the desired shape of the finalized electrically conductive element and the level of corrosion susceptibility of the underlying metal substrate 58, 60. The titanium coating 98 serves as an additional protective barrier between the conditions in the fuel cell and the underlying metal substrate 58, 60. The titanium coating 98 is believed to further enhance the longevity of the electrically conductive element by increasing the adhesion of the adhesion promoting coating 101 and any protective coating 102 thereby increasing the amount of time a fuel cell, for example, can successfully operate and improve the electrical conductivity thereof.

As appreciated by one of skill in the art, the present disclosure details useful methods for increasing adhesion of any protective coatings 102 applied for protection on fuel cell elements that are exposed to fuel cell conditions. For example, as shown in FIG. 4, the inner surfaces 90,92 of each plate 58,60 which face coolant passages 78 of the bipolar plate 56, are also coated with a titanium coating 98, an adhesion promoting coating 101, and a protective polymeric coating 102.

In various embodiments of the present invention, the surfaces (e.g., 59, 63, 90, 92) of the substrates 58,60 are susceptible to forming oxides in the presence of oxygen, which can lead to corrosion problems in the electrochemical cell. One or titanium metal oxide regions 100 are present on the protective titanium coating layer 98, along metal substrate surfaces 59,63,90,92, over which the adhesion promoting coating 101 is applied. Such metal oxide layers may also be referred to as passivated regions 100, where "passivated" refers to the presence of metal oxides at the surface as compared to a region having a metal without metal oxides. The passivated regions 100 may comprise a variety of concentrations of metal oxides present along the titanium coating layer 98, ranging from a low concentration (where most oxides have been removed) to a high concentration (forming a thick continuous layer). As used herein, the term "passivation layer" is synonymous with surface regions having metal oxides, and refers to the select regions 100 of the titanium coating layer 98 where metal oxides are present. Such a metal oxide passivation layer 100 over the titanium coating 98 may cover discrete regions or an entire continuous area of the substrate surface (e.g., 59,63,90, 92).

Exposure to ambient air is generally sufficient to form passivated metal oxide regions 100 on a substrate susceptible to metal oxide formation. Also, intentional processing, such as anodization, forms select passivated regions 100 on a substrate susceptible to metal oxide formation. In a preferred embodiment of the present invention, the titanium coating 98 applied over the surface (such as, 59,63) of a substrate (such as, 58,60) has at least a small concentration of titanium oxides present. It should be noted that the titanium oxides typically are less electrochemically reactive than the base titanium. However, a titanium oxide layer facilitates better adhesion of a silane adhesion promoting sub-layer coating 101, and consequently, the overlying protective polymeric coating 102, as described earlier herein. Enhanced adhesion minimizes potential flaws in the overlying protective polymeric coating, such as pinholes which expose underlying areas of uncoated metal. These pinholes arise as small, unprotected regions of the metallic surface, and have the potential to become growth sites for corrosion, especially with stainless steel substrates. Thus, in electrically conductive regions it is preferred to remove a sufficient amount of titanium oxides and any oxides on the metal substrates 58,60 to reduce electrical resistivity, while ensuring a sufficient amount of titanium oxides are present to effectively adhere the adhesion promoting sub-layer coating 101.

Protective polymeric coatings 102 are selected for their ability to withstand extreme fuel cell conditions and for their adhesion to select metal compositions, including metal oxide regions of the metal substrate (for the sake of brevity, the present discussion focuses on an exemplary half of the bipolar plate assembly, 56, namely the conductive element/substrate 58, which while used herein as an example, is not limiting to the applicability of the present invention). However, such polymers have previously been limited to those with good adherence to metals and metal oxides. The present invention permits the use of an additional class of protective polymers for the protective polymeric coating 102 that have desirable conductivity, and cost, but previously lacked compatibility with and sufficient adhesion to metals. The present invention further provides improved performance for polymers that are presently used in protective polymeric coatings 102 by increasing adhesive properties to the substrate 58 surface 59 through use of the adhesion promoting coating 101.

Generally adhesion promoting coatings 101 are used to obtain improved adhesion between two distinct elements, (e.g., the substrate 58 and the polymeric coating 102). A "primer" generally refers to a coating applied to a surface prior to the application of another polymeric coating to improve the performance of the bond between the surface (e.g., 58) and the polymeric coating (e.g., 102). Implementing the titanium coating 98 further enhances fixation of the adhesion promoting coating 101 to the underlying metal substrate 58. The adhesion promoter primer coating 101 is preferably a substance capable of adhering materials together by surface attachment. The adhesion promoting coating 101 is preferably compatible with the titanium coating 98, the substrate 58, and the protective polymeric coating 102 even when they have dissimilar properties. Adhesion promoting coatings 101 typically operate by Van der Waals attraction, hydrogen bonding and chemical bonding. Chemical covalent bonds are preferable because the covalent bonds have increased resistance to environmental changes and adverse conditions as compared to hydrogen bonding or Van der Waals attractions. In certain embodiments, the adhesion promoting coating 101 is covalently bonded to the titanium coating 98 and the overlying protective polymeric coating 102 to improve endurance in the high pressure, heat and moisture conditions in a fuel cell.

In certain embodiments of the present invention, the adhesion promoting coating 101 comprises a silicon containing polymer. Generally, such silicon adhesion promoting polymers are formed from a starting material composition comprising a silane compound that is treated to form the adhesion promoting polymer. As used herein, silanes refer to compounds having the general structure $SiH_4$. The silanes can be functionalized where one or more of the hydrogen atom(s) is substituted with a constituent group. Depending on the selected constituent groups present in the compound, silanes can be further classified into sub-groups of organo-functional silanes, amino-functional silanes, halosilanes, and silazanes.

For example, halosilanes comprise chlorosilanes, which are silanes with a chlorine functional group, and fluorosilanes with a fluorine functional group. As appreciated by one of skill in the art, the variations in possible combinations of constituent groups useful for the present invention and corresponding to applicable classifications of silanes are extensive. Silanes are preferred starting materials for coupling agents. After treatment, the adhesion promoting polymers link the interfaces of two dissimilar substrates due to their dual organic and inorganic properties. Treated silanes are also attractive because they are easy to apply as thin layers to a substrate.

The most widely used silane adhesion promoter coupling agent coatings 101 are formed from the organo-functional silanes represented by the generally accepted nominal formula $YRSiX_3$, where X represents a hydrolyzable group such as an alkoxy (for example, methoxy, ethoxy, phenoxy, acetoxy, or a halogen halide) and Y represents a non-hydrolysable functional organic group such as amino, amido, acrylate, hydroxyl, alkoxy, halo, mercapto, carboxy, acyl, vinyl, allyl, styryl, epoxy, isocyanate, glycidoxy, methacryloxy and azido and acryloxy. R is a small aliphatic linkage between the functional organic group and the silicon. R may comprise groups having the formula, $—(CH_2)_n—$, as a non-limiting example, such as methyl, ethyl, propyl, and butyl groups. With their organic and inorganic properties, organo-functional silanes are useful as adhesion promoting coatings 101 between the titanium layer 98 and the polymeric protective coating 102. As another example, if the functional silane contains a polymerizable functionality such as a vinyl group, it can be polymerized to further enhance the strength of the adhesion promoting coating and/or the polymer coating.

Although not wishing to be bound to any particular theory by which the present invention operates it is believed that the hydrolysable organic portions of the organo-functional silanes in the adhesion promoting coating 101 interact and bond with titanium oxides 100 (or tantalum or zirconium oxides) present along the titanium coating 98 and the non-hydrolysable organic portions of the adhesion promoting coating 101 interacts and bonds with the polymeric coating 102.

Various silanes are also capable of crosslinking. The present invention contemplates use of self-crosslinking silanes, so long as sufficient organic groups remain available for interaction with the titanium coating 98 and/or polymeric coating 102. In certain embodiments, some level of crosslinking occurs to enhance the physical integrity of the silane adhesion promoting coating 101. In some embodiments, the present invention contemplates addition of a stabilizer to a self-crosslinking silane polymer to control (generally by slowing) the rate of self-crosslinking. Further, it is preferred that the stabilizer is selected so as to not leave a residue that potentially may contaminate the fuel cell during operations.

Preferred organo-functional silanes used to form adhesion promoting polymer coatings 101 according to the present invention include the following non-limiting group: 6-azidosulfonylhexyltriethoxysilane; bis[(3-ethoxysilyl)propyl] ethylenediamine; N-[3-triethoxysilylpropyl]-4,5-dihydroimidazole; 3-aminopropyltriethoxysilane; 3-isocyanate propyltriethoxy-silane, diethoxyphosphate ethyltriethoxysilane; 5,6-epoxyhexyltriethoxysilane; bis-[3-(triethoxysilyl) propyl]amine; 3-aminopropylmethyldiethoxysilane; N-(2-aminoethyl)-3-aminopropyl-trimethoxysilane; N-(2-aminoethyl)-3-aminopropyl-methyldimethoxysilane; bis-[3-(triethoxysilyl)propyl]disulfide; bis-[3-(triethoxysilyl) propyl]tetrasulfide; 3-mercaptopropyltriethoxysilane; aminopropylmethyldiethoxysilane; chloropropyltriethoxysilane; chloropropyltrimethoxysilane; glycidoxypropyltrimethoxysilane; 3-isocyanate-propyltrimethoxysilane; 3-isocyanate-propyltriethoxy silane; mercaptopropyltrimethoxysilane; methacryloxypropyltrimethoxysilane; methyltriacetoxysilane (MTAS); methyltrimethoxysilane (MTMS); methyl tris-(butanone oxime) silane (MOS); methyl oximino silane (MOS); methyl tris-(methyl ethyl ketoximo) silane (MOS); tetraethoxysilane (TEOS); tetramethoxysilane (TMOS); vinyltriethoxysilane; vinyltrimethoxysilane; vinyl tris-(butanone oxime) silane (VOS); vinyl oximino silane (VOS); and vinyl tris-(methyl ethyl ketoximo) silane (VOS). In a preferred embodiment, the organo-functional silanes are 6-azidosulfonylexyltriethoxysilane; bis[(3-ethoxysilyl)propyl]ethylenediamine; N-[3-triethoxysilylpropyl]-4,5-dihydroimidazole; 3-amino-propyltriethoxysilane; diethoxyphophate-ethyltriethoxysilane; 5,6-epoxyhexyltriethoxysilane; copolymers; and mixtures thereof. Particularly preferred silane polymers useful with the present invention are selected from the group consisting of 6-azidosulfonylhexyltriethoxysilane; bis[(3-ethoxysilyl)propyl]ethylenediamine; N-[3-triethoxysilylpropyl]-4,5-dihydroimidazole; 3-aminopropyltriethoxysilane; diethoxyphosphate ethyltriethoxysilane; 5,6-epoxyhexyltriethoxysilane, co-polymers and mixtures thereof. A most preferred silane polymer comprises 3-aminopropyltriethoxysilane. It should be noted that certain embodiments of the present invention contemplate other polymers not listed above that are well known to those of skill in the art as adhesion promoting agents between metal and polymer interfaces, as being suitable for use in the adhesion promoting coating 101.

The hydrolyzable X constituent side group (i.e., alkoxy group) of the organo-functional silane is hydrolyzed to form a silanol where the hydrolyzable groups are replaced by hydroxyl groups via reaction with a hydrolyzing agent. When the adhesion promoting coating 101 is applied to the titanium coating 98 having the metal oxide layer 100, it is believed that these hydroxyl groups on the silanol are oriented towards the metal oxide regions 100 on the titanium coating surface 98, due to either covalent bonding or Van der Waals attraction. As previously discussed, the following descriptions of the mechanism by which the present adhesion promoter coating 101 is believed to operate are not intended to be limiting as to how present invention operates.

The hydrolyzable functional groups designated as X on the functionalized silane (e.g., $YRSiX_3$) become the hydroxyl groups on the corresponding silanol (e.g., $YRSi(OH)_3$) which are available for reaction. As stated, the X group is preferably an alkoxy group (i.e., methoxy). In one example, the alkoxy group is hydrolyzed forming a corresponding alcohol by-product of the X group (for example, methanol), and thereby produces $RSi(OH)_3$ having three hydroxyl groups available for reacting with the metal oxides on regions of the substrate. The newly formed alcohol by-product from the hydrolysis reaction can be volatilized and does not interfere with the coating preparation or application thereof.

A subsequent dehydration of the three available hydroxyl groups on the silanol molecules $YRSi(OH)_3$ is believed to form two types of covalent bonds. The first is a self-bonding between silanol groups that results in the establishment of a silicon-oxygen backbone. While not intending to be limited by any particular mechanism, it is believed that the condensation of the silanol molecules allows for the silicon of a first silanol to bond with the oxygen of a second silanol molecule. The silicon-oxygen backbone serves as the link between the newly formed metal-oxide bonds and the available R groups within the backbone. After the successive linking of silanol molecules to form the silicon-oxygen backbone, the second type of covalent bond is formed between the available hydroxyl groups on the silanol and the metal oxides on the titanium layer 98. The organic properties of the available R groups connect the silane adhesion promoting layer 101 with the protective polymeric coating 102 applied over the adhesion promoting coating 101, most likely through covalent bonds between the carboxyl groups on the protective polymeric coating resin chains thus providing a strong link between the protective polymeric coating 102 and the titanium layer 98.

Alternative preferred embodiments of the present invention relate to preferred methods of preparing the adhesion promoting coating 101. One such method according to the present invention comprises introducing or admixing a hydrolyzing agent into a solution comprising a functionalized silane and a solvent. In particularly preferred embodiments, the adhesion promoting solution comprises an organo-functional silane. The hydrolyzing agent serves to hydrolyze certain hydrolyzable functional groups (i.e., X) on the functionalized silane and the resultant hydrolysis promotes the interaction between the titanium coating 98 and the polymer coating 102. If this functional silane contains polymerizable functionality such as a vinyl group, it can be polymerized to form an adhesion promoting coating. Suitable hydrolyzing agents comprise acids. In some embodiments, preferred hydrolyzing agents comprise organic acids. It is preferred that the hydrolyzing agent comprises an organic acid. In one embodiment, the organic acid is glacial acetic acid.

Further, the adhesion promoting solutions of the present invention preferably comprise one or more solvents. One suitable solvent is water. After addition of the hydrolyzing agent, it is preferred that the adhesion promoting coating solution is well mixed and has a pH of from about 3 to about 5 to promote the hydrolysis reaction. In certain preferred embodiments, the solution having the hydrolyzing acid agent is mixed for a short duration (e.g., about 10 minutes). As detailed above, the hydrolyzing agent hydrolyzes the hydrolyzable functional groups on the functionalized silane (e.g., $YRSiX_3$) into the corresponding silanol.

In another preferred embodiment, the adhesion promoting coating solution further comprises an optional wetting agent. Preferred wetting agents facilitate or enhance the application of the adhesion promoting polymer solution to the substrate. Particularly preferred wetting agents leave the substrate free from wetting agent residue after application of the adhesion promoting solution. In some embodiments, the wetting agents comprise an alcohol of low molecular weight including, by way of non-limiting example, ethanol, methanol, propanol, (e.g., isopropanol, 1-propanol, 1-butanol, etc.) and mixtures thereof. The wetting agent can also be acetone. In one embodiment, the wetting agent comprises ethanol. In other embodiments, the wetting agent comprises an alkane. Preferably, the alkane has a carbon backbone having less than 15 carbon atoms. In certain embodiments, the alkane comprises heptane. It is preferred that the backbone has less than 15 carbon atoms to facilitate volatilizing of the alkane in the solvent after application of the adhesion promoting coating solution 101 onto the titanium coating 98. In certain embodiments, the addition of the wetting agent facilitates easy application of the silane adhesion promoting coating solution onto the substrate. The non-polar alkane wetting agent provides better uniformity of the surface tension of the coating. With certain solvent polymer systems, the surface tension may be insufficient and the coating may pull away and form circular spots or regions lacking coating called "fish-eyes".

The solution of adhesion promoting coating 101 may be applied to the titanium coating 98 using known application methods which include gravure coating, reverse roller coating, doctor blade coating, dipping, painting, spraying, brushing, electrodeposition, vapor deposition, and the like. The solution of adhesion promoting coating 101 may also be applied using the coil coating techniques described above herein. After application of the adhesion promoting coating solution 101 in liquid phase, it is preferred that the solvents and substantially all of the compounds dissolved therein are removed from the liquid layer, preferably by volatilization, thereby leaving the polymer a dry coating 101 along the regions of the surface 59 where the titanium coating 98 and the adhesion promoting coating 101 solution was applied. Thus, after applying the adhesion promoting solution 101 to the electrically conductive element 58 heat and/or reduced pressure are applied to volatize the solvents, wetting agents, and remaining compounds or byproducts from the hydrolyzation process. Preferred methods of applying heat include placing the coated substrate in an oven and drying within a temperature range of about 85° C. to about 150° C. for 10 to 15 minutes. Any type of oven is suitable, including both non-vacuum and vacuum or aspiration ovens. Preferred ovens are non-vacuum ovens. In an embodiment where an aspirator is used, the element is dried under a drawn vacuum for a time sufficient to dry the solution and remove all solvents and additional components, generally from 30 minutes to 16 hours. Upon completion of the drying, a solid coating layer of the silane adhesion promoting polymer coating 101 is formed on the titanium coating 98 on the metal substrate 58.

In preferred embodiments, the dry adhesion promoting coating 101 has a thickness of less than 100 angstrom (10 nanometers). In a particularly preferred embodiment, the silane adhesion promoting coating 101 has a thickness of between about one to a few monolayers. Such a thickness can be achieved by a single application of the adhesion promoter liquid solution 101 onto the titanium layer 98. Where a desired thickness for the adhesion promoter coating 101 is greater than a few monolayers, a thicker coating 101 is achieved by applying multiple layers of the coating solution in discrete sequential applications.

The one or more titanium oxide regions 100 over the substrate 58 having the adhesion promoting coating 101 are further overlaid with the protective polymer coating 102. The protective coatings 102 of the present invention are preferably both oxidation-resistant and corrosion-resistant, thereby protecting the underlying metal substrate 58 from exposure to corrosion agents. The additional security and bonding strength from the titanium coating 98 enhance the corrosion-resistant and oxidation-resistant properties of the protective coating and further protect the underlying metal substrate 58. In certain preferred embodiments where the regions 100 form electrically conductive pathways in the fuel cell, it is also preferred that the protective coatings 101,102 overlying the surface 59 of the substrate 58 are electrically conductive and have a bulk resistivity of less than about 50 Ohm-cm ($\Omega$-cm). In certain embodiments, the contact resistance at the interface between distinct material, for example, of the coating with the next element within the fuel cell, should be less than about 50 milliOhm-cm$^2$, preferably less than 25 milliOhm-cm$^2$.

In certain embodiments, the protective coating 102 is electrically conductive and comprises a plurality of oxidation-resistant, acid-insoluble, conductive particles (i.e., less than about 50 micrometers) dispersed throughout an acid-resistant, oxidation-resistant polymer matrix, where the polymer matrix binds the particles together. It is preferred that the coating 102 contains sufficient conductive filler particles to produce a resistivity no greater than about 50 Ohm-cm. Thinner protective polymeric coatings 102 (i.e., about 15-25 micrometers) are most preferred for minimizing the IR drop through the stack. In various embodiments of the present invention, the protective coating 102 has a thickness between about 5 micrometers and about 75 micrometers, preferably between about 5 and about 30 micrometers, depending on the composition, resistivity and integrity of the coating. Impervious protective coatings 102 are preferred for the present invention to protect the underlying metal substrate 58 surface from permeation of corrosive agents.

Such a conductive polymer coating 102 is applied directly over the dried silane polymer adhesion promoting coating 101 on the titanium layer 98 on the metal surface 59 and allowed to dry and cure thereon. The coating 102 may be applied in a variety of ways, and examples of such methods are described in detail in U.S. Pat. No. 6,372,376 to Fronk et al. and may include (1) electrophoretic deposition, (2) brushing, spraying or spreading, or (3) laminating. Electrophoretically deposited coatings are particularly advantageous because they can be quickly deposited in an automated process with little waste, and can be deposited substantially uniformly onto substrates having complex and recessed surfaces like those used to form the reactant flow fields on the working surface(s) of the conductive elements. Electrophoretic deposition is a well-known process used to apply polymers to conductive substrates. When cross-linkable polymers are used, the suspension also preferably includes a catalyst and/or curing agent for promoting the cross-linking. Cathodically deposited coatings are deposited by a process wherein a positively charged polymer is deposited onto a negatively charged substrate. Cathodic epoxies, acrylics, urethanes and polyesters are useful with this method of depositing the coating. Other examples of suitable polymers include thermoset and thermoplastic resins, such as those disclosed in the U.S. Pat. No. 6,372,376 to Fronk, et al. and the references cited therein. Subsequent treatment of the conductive element cures and densities the coating, for example, treatment includes heating and/or UV light application.

According to other embodiments of the invention, the protective polymeric coating 102 is applied over the silane adhesion promoting coating 101 by spraying, brushing, or spreading (e.g., with a doctor blade). In these embodiments, a precursor of the protective polymeric coating 102 is formed by dissolving the polymer in a suitable solvent, optionally mixing conductive filler particles 97 with the dissolved polymer (where the polymeric coating 102 is conductive) and applying it as wet slurry atop the silane adhesion promoting coating 101. The wet coating is then dried (i.e., the solvent removed) and cured as needed (e.g., for thermosets). The conductive particles 97 adhere to the metal surface 59 via the titanium coating 98 by means of the solvent-free polymer and the titanium coating 98 interaction with the adhesion promoting coating 101. Coil coating, as detailed above, can also be used to place the wet slurry on the metal surface 59 and dry the wet coating in the various treatment phases of the coil coating process.

Figure 5:
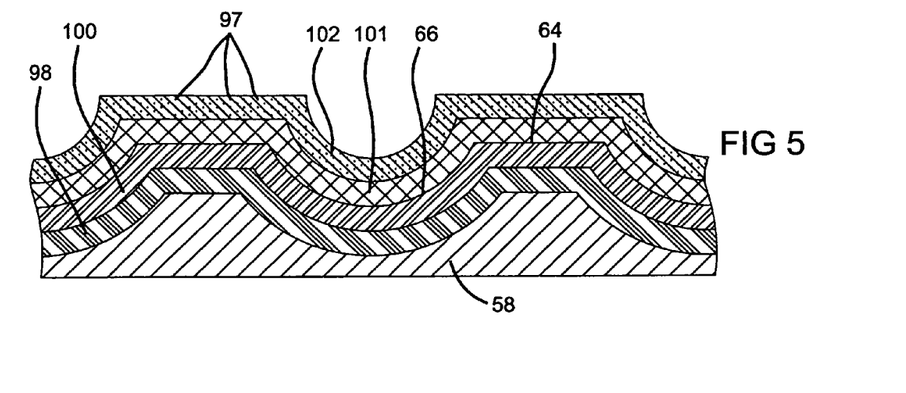
FIG. 5 is a partial cross-sectional view of a working surface of a preferred embodiment of the present invention showing a substrate having a continuous region coated with a metal coating layer, an adhesion promoting coating, and a conductive protective polymeric coating.

As shown in FIG. 5, in preferred embodiments, the protective coating 102 overlays a continuous region of the surface having titanium oxides 100 on the substrate 58, for example, where the coated region 100 corresponds to the entire flow field comprising both lands 64 and grooves 66. The electrically conductive protective polymeric coating 102 having conductive particles 97 dispersed therein is applied across the continuous region 100 of the flow field and overlays the adhesion promoting coating 101.

Figure 6:
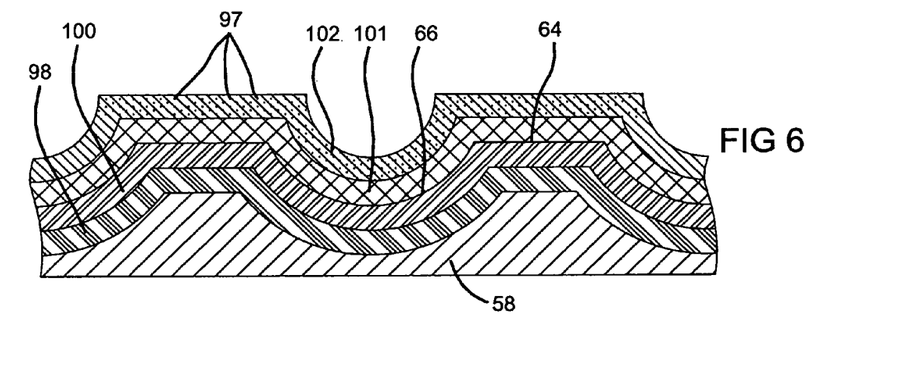
FIG. 6 is a partial cross-sectional view of a working surface of another preferred embodiment of the present invention showing a substrate having a continuous region coated with a metal coating layer and an adhesion promoting coating overlaid with a protective polymeric coating having conductive regions and non-conductive regions.

In alternate embodiments, such as that shown in FIG. 6, the one or more coated regions 100 comprise the adhesion promoting coating sub-layer 101 and overlaid with the protective polymeric coating 102. In the embodiment shown, certain regions of the protective polymeric coatings 102a are electrically conductive, and thus also comprise a plurality of oxidation-resistant, acid-insoluble, conductive particles 97 (i.e., less than about 50 micrometers) that are dispersed along the electrically-conductive regions, i.e., the lands 66, to ensure electrical conductivity. Conductive particles 97 are present in the land 64 regions only (i.e., conductive regions of the protective coating 102a) where electrical conductivity is necessary, but are generally not present in the non-conductive groove regions 66. A polymer matrix is applied across the entire flow field of lands and grooves 64,66, such that the grooves 66 are coated with a non-conductive protective polymeric coating 102b (without conductive particles 97). Such selective application of conductive particles 97 can be achieved by sprinkling the conductive particles 97 over the lands 64 only (and not in the groove regions 66).

Masking is also desirable in manufacturing situations where different coating compositions are used on the lands 64 and the grooves 66, such as that shown in FIG. 6. In an alternative method of application according to the embodiment shown in FIG. 6, masking is particularly useful and can be used for applying a first non-conductive polymer coating 102 having no conductive particles 97 to select regions 120 corresponding to grooves 66. After the application of the first polymer coating 102, a first mask 106 can be removed and the newly coated regions 120 can be subsequently masked with a second mask (not shown). The second conductive polymer coating 102 having conductive particles 97 dispersed therein, can be applied to the exposed regions 120 that were previously masked with the first mask 106. As recognized by one of skill in the art, the compositions of the protective polymer coatings 102 may be different from one another, in the embodiment where the coatings differ over discrete regions.

Figure 7:
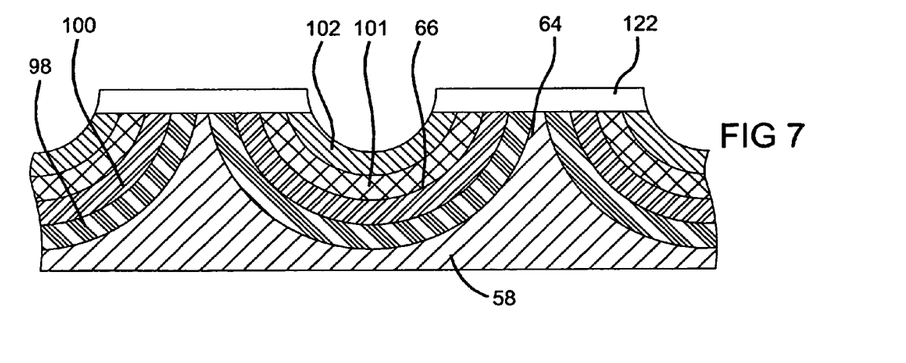
FIG. 7 is a partial cross-sectional view of a working surface of another preferred embodiment of the present invention showing a plurality of lands and grooves formed in the surface of a substrate, where the regions corresponding to the grooves are coated with a metal coating layer and an adhesion promoting coating overlaid with a protective polymeric coating, and the lands are coated with an electrically conductive layer.

In this manner, different compositions of polymeric coatings can be applied to different regions of the titanium layer 98, for example, having a higher electrical conductivity may be applied to the lands 64 and a less electrically conductive polymeric coating 102 could be applied to the grooves 66, because only the lands 64 establish an electrically conductive path to other elements in a fuel cell assembly. Additionally, as shown in FIG. 7, other electrically conductive materials 122 could be applied to the lands 64, such as non-oxidizing metals, including for example, gold, platinum, rhodium, or mixtures and thereof. In the grooves 66, coated regions 100 comprise the adhesion promoting coating 101 overlaid with a non-conductive protective coating 102.

Figure 8:
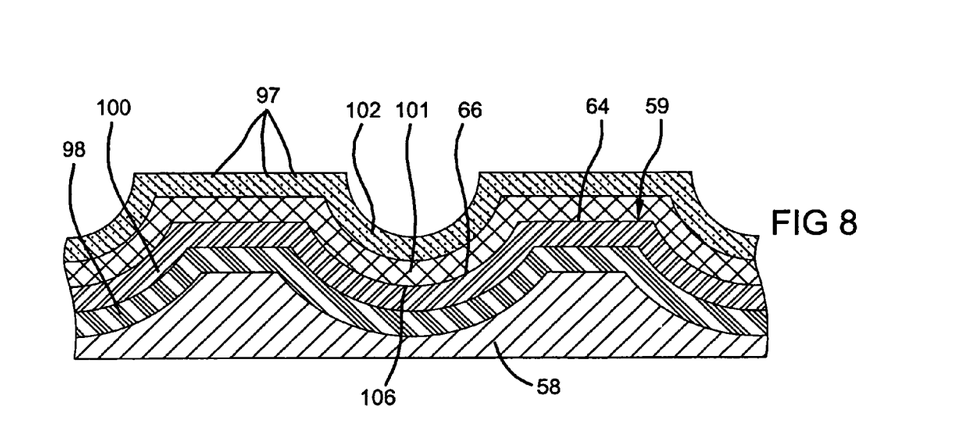
FIG. 8 is a partial cross-sectional view of a working surface of an alternate preferred embodiment of the present invention showing a substrate having a plurality of lands and grooves formed therein, where the metal oxides are removed in the regions corresponding to the lands of the surface and the metal oxides remain in the regions corresponding to the grooves, where both the lands and grooves further have a continuous region coated with a titanium coating and an adhesion promoting coating and a conductive protective polymeric coating.

In alternate embodiments such as that shown in FIG. 8, it is desirable to have the metal oxide coating 100 present only in the regions corresponding to grooves 66 of the flow field metal substrate working surface 59. To selectively remove metal oxides 100 from the substrate 58, the grooves 66 are covered with a masking material (not shown) before treating to remove the metal oxides therefrom (for example, by plasma etching). After removing the select regions of metal oxides (leaving the metal oxides remaining on the grooves 66) the masking material is removed. The adhesion promoting coating 101 is applied both to the untreated grooves 66 and the treated lands 64. The coating process could also be adapted to coat the grooves 66 with a thicker coating of adhesion promoting coating 101, by performing coating many times while the masking material 106 remains on the lands 64, depending on the desired final thickness of the adhesion promoting coating 101 and/or the protective polymeric coating 101 in the grooves 66. A conductive protective polymeric coating 102 is applied over the lands 64 and grooves 66.

Figure 9:
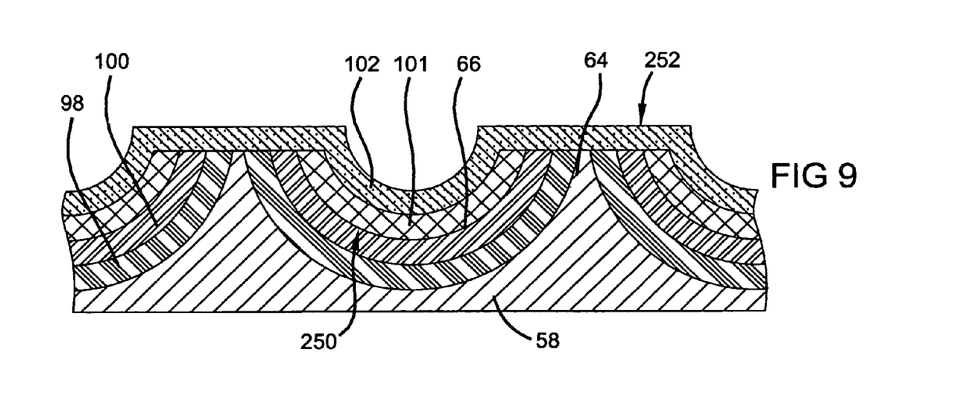
FIG. 9 is a partial cross-sectional view of a working surface of a preferred embodiment of the present invention where a plurality of lands and grooves are formed in the surface and the lands are overlaid with a protective polymeric coating and the grooves are overlaid with a metal coating layer, an adhesion promoting coating, and a protective polymeric coating.

It should be noted that the present invention contemplates alternate embodiments, such as that shown in FIG. 9, where one or more regions 250 comprise both the adhesion promoting coating 101 and the protective coating 102, as where other regions 252 may comprise only a protective coating 102 without the adhesion sub-layer 101 and without the titanium layer 98. The regions 250 with the adhesion promoting coating 101 and the protective coating 102 ensure enhanced adhesion and protection, as where the single coated regions 252 have sufficient protection via the protective coating 102 alone. In such embodiments, the single coated regions 252 have a reduced electrical resistance by eliminating additional contact resistance and bulk resistance associated with additional sub-layers, namely the titanium coating 98 and the adhesion promoting coating 101. The single coated regions 252 generally correspond to electrically conductive regions of the surface 59, here corresponding to the lands 64.

Preferably, the conductive filler particles 97 for the electrically conductive protective polymer coating 102 are selected from the group consisting of gold, platinum, graphite, carbon, nitrides and carbides (e.g., titanium nitride, titanium carbide), titanium alloyed with chromium and/or nickel, palladium, niobium, rhodium, rare earth metals, and other noble metals. Most preferably, the particles comprise carbon or graphite (i.e., hexagonally crystallized carbon). The particles 97 comprise varying weight percentages of the protective coating 102 depending on the density and conductivity of the particles (i.e., particles having a high conductivity and low density can be used in lower weight percentages). Carbon/graphite containing coatings 102 will typically contain 25 percent by weight carbon/graphite particles.

The polymer matrix of the protective coatings 102 of the present invention preferably comprise any water-insoluble polymer that can be formed into a thin adherent film and that can withstand the hostile oxidative and acidic environment of the fuel cell. Further, it is preferred that the selected polymer is compatible with the adhesion promoting coating 101. Hence, such polymers as epoxies, silicones, polyamide-imides, polyether-imides, polyphenols (phenolics), fluoro-elastomers (e.g., polyvinylidene fluoride), polyesters, phenoxy-phenolics, epoxide-phenolics, acrylics, urethanes, and mixtures thereof, inter alia are seen to be useful with the present invention. Cross-linked polymers are preferred for producing impermeable protective coatings 102.

An example of a polymer useful with this embodiment comprises a polyamide-imide thermosetting polymer. It is preferred that the polyamide-imide is dissolved in a compatible solvent vehicle for application, as recognized by one of skill in the art. For example, in one preferred embodiment, the polyamide-imide is dissolved in a solvent comprising a mixture of N-methylpyrrolidone, propylene glycol and methyl ether acetate. To this solution is added about 21% to about 23% by weight of a mixture of graphite and carbon black particles wherein the graphite particles range in size from about 5 micrometers to about 20 micrometers and the carbon black particles range in size from about 0.5 micrometers to about 1.5 micrometers, with the smaller carbon black particles serving to fill the voids between the larger graphite particles and thereby increase the conductivity of the coating compared to that of all-graphite coatings.

In preferred embodiments of this invention, the protective polymer coating 102 is applied over the silane adhesion promoting coated 101 and titanium coated 98 substrate 58, and is dried and cured. It is preferred that the polymer coating 102 is coated to provide a coating thickness of about 15-30 micrometers (preferably about 17 micrometers), and has a carbon-graphite content of about 38% by weight. It may be cured slowly at low temperatures (i.e., <200° C.), or more quickly in a two-step process wherein the solvent is first removed by heating for ten minutes at about 150° C. to 175° C. (i.e., dried) followed by higher temperature heating (250° C. to 400° C.) for curing, typically for a duration of between approximately about 30 seconds to about 15 minutes, with the time ultimately being dependent on the temperature used to cure each specific polymer.

As previously discussed, metal oxides significantly increase electrical resistance of metal substrates, and in preferred embodiments, a large portion of such metal oxides are removed from metal substrate surfaces to be coated with polymers. Metal oxides can be removed by plasma etching or by sputtering. Any method of removing oxides known to one of skill in the art that does not detrimentally impact the physical properties of the metal is contemplated for use with the present invention.

In certain preferred alternate embodiments of the present invention, the metal substrate is pre-cleaned prior to applying the adhesion promoting solution. Such cleaning typically serves to remove any loosely adhered contaminants, such as oils, grease, waxy solids, particles (including metallic particles, carbon particles, dust, and dirt), silica, scale, and mixtures thereof. Many contaminants are added during the manufacturing of the metal material, and may also accumulate on the surface during transport or storage. Thus, pre-cleaning is preferred in circumstances where the metal substrate provided for processing is soiled with contaminants. Pre-cleaning may entail mechanical abrasion; cleaning with traditional alkaline cleaners, surfactants, mild acid washes; or ultrasonic cleaning. The choice of the appropriate cleaning process or sequence of cleaning processes is selected based upon both the nature of the contaminant and the metal.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of making an element for a fuel cell, comprising:
    providing a metal substrate surface susceptible to forming oxides in the presence of oxygen;
    applying a metal coating to one or more regions of the substrate, wherein said metal coating includes a continuous layer of oxides of said metal;
    applying an acidic solution having a pH of about 3 to about 5 which comprises an adhesion promoting coating comprising a polymer comprising silicon over said continuous layer of oxides on said metal coating; and
    overlaying said adhesion promoting coating with a corrosion resistant protective polymeric coating.

2. The method of claim 1, wherein applying said metal coating is conducted by at least one process selected from the group consisting of: physical vapor deposition, chemical vapor deposition, and coil coating.

3. The method of claim 1, wherein said substrate surface is susceptible to forming oxides in the presence of oxygen and prior to said applying, treating said surface to partially remove said oxides by at least one process selected from the group consisting of: plasma etching, sputtering, cathodic cleaning; mechanical abrasion;
    applying alkaline cleansers; applying acidic agents; and applying pickle liquors.

4. The method of claim 1, further comprising after said overlaying, applying heat to promote curing of said adhesion promoting coating and said corrosion resistant protective polymer coating applied on said substrate.

5. A method of making an element for a fuel cell, comprising:
  admixing a hydrolyzation agent with an adhesion promoting solution to form a mixture; wherein said adhesion promoting solution comprises a functionalized silane and an acidic solvent comprising water and wherein said hydrolyzation agent hydrolyzes at least a portion of said functionalized silane to form a polymer comprising silicon;
  applying said mixture to one or more regions of a metal coating layer which overlies a metal substrate and further wherein the metal coating layer includes a continuous layer of oxides of said metal, wherein a portion of said solvent and a portion of said hydrolyzation agent are removed from said mixture, and wherein said polymer comprising silicon remains in a substantially solid phase overlying said continuous layer of oxides on said metal coating layer to form an adhesion promoting coating; and
  overlaying said adhesion promoting coating with a corrosion resistant protective polymeric coating at said one or more regions.

6. The method of claim 5, wherein said functionalized silane undergoes self-crosslinking and said solution further comprises a stabilizing agent for slowing a rate of said self-crosslinking.

7. The method of claim 5, wherein said adhesion promoting solution further comprises a wetting agent selected from the group consisting of an alcohol, an alkane, and mixtures thereof.

8. The method of claim 7, wherein said wetting agent is selected from the group consisting of acetone, ethanol, methanol, isopropyl alcohol, 1-propanol, heptane, and mixtures thereof.

* * * * *